US012672049B2

(12) United States Patent
Lee et al.

(10) Patent No.: US 12,672,049 B2
(45) Date of Patent: Jun. 30, 2026

(54) METHOD AND DEVICE FOR SUPPORTING EDGE APPLICATION SERVER IN WIRELESS COMMUNICATION SYSTEM SUPPORTING EDGE COMPUTING

(71) Applicant: Samsung Electronics Co., Ltd., Gyeonggi-do (KR)

(72) Inventors: Cheolung Lee, Gyeonggi-do (KR); Hyesung Kim, Gyeonggi-do (KR); Sungjin Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 688 days.

(21) Appl. No.: 17/982,987

(22) Filed: Nov. 8, 2022

(65) Prior Publication Data

US 2023/0141745 A1     May 11, 2023

(30) Foreign Application Priority Data

Nov. 10, 2021    (KR) ........................ 10-2021-0154339
Mar. 29, 2022    (KR) ........................ 10-2022-0039245

(51) Int. Cl.
*H04W 4/00*        (2018.01)
*H04W 4/50*        (2018.01)
*H04W 48/08*       (2009.01)
*H04W 48/16*       (2009.01)

(52) U.S. Cl.
CPC ............. *H04W 48/08* (2013.01); *H04W 4/50* (2018.02); *H04W 48/16* (2013.01)

(58) Field of Classification Search
CPC ........ H04W 48/08; H04W 48/16; H04W 4/50
USPC ........................................................ 370/329
See application file for complete search history.

(56) References Cited

U.S. PATENT DOCUMENTS

| | | | | |
|---|---|---|---|---|
| 2020/0404069 A1* | 12/2020 | Li | ........................... | H04L 67/59 |
| 2021/0101612 A1* | 4/2021 | Hall | ........................ | H04L 67/52 |
| 2021/0136177 A1* | 5/2021 | Hall | ................... | H04L 41/5051 |
| 2021/0307018 A1* | 9/2021 | Qaisrani | .............. | H04W 48/16 |
| 2022/0015018 A1* | 1/2022 | Kim | ..................... | H04W 48/16 |

(Continued)

FOREIGN PATENT DOCUMENTS

| | | |
|---|---|---|
| KR | 1020230048895 | 4/2023 |
| WO | WO 2021/086157 | 5/2021 |

OTHER PUBLICATIONS

3GPP TS 23.558 V17.1.0, 3GPP, 3rd Generation Partnership Project; Technical Specification Group Services and System Aspects; Architecture for Enabling Edge Applications; (Release 17), Sep. 2021, 162 pages.

(Continued)

*Primary Examiner* — Temica M Beamer
(74) *Attorney, Agent, or Firm* — The Farrell Law Firm, P.C.

(57)        ABSTRACT

The disclosure relates to a 5G or 6G communication system for supporting a higher data transmission rate, and relates to a method and device for efficiently supporting an EAS in a wireless communication system supporting edge computing. A method performed by an EES is provided, which includes receiving, from an EAS not configured in the EES, a registration request message including network slice information related to the EAS, selecting a UE to which EAS information about the EAS is to be provided and a method for providing the EAS information, and providing the EAS information to the UE based on the selected method.

10 Claims, 6 Drawing Sheets

(56) References Cited

U.S. PATENT DOCUMENTS

2023/0034349 A1 *  2/2023  Mladin .................. H04W 4/40
2023/0108959 A1    4/2023  Kim et al.

OTHER PUBLICATIONS

Apple, "Pseudo-CR on Enhancements to the Information Elements sent by the Edge Enabler Client and Edge Enabler Server", S6-200460, 3GPP TSG-SA WG6 Meeting #36 BIS-e, Mar. 31-Apr. 8, 2020, 5 pages.
3GPP TR 28.815 V1.3.0, 3rd Generation Partnership Project; Technical Specification Group Services and System Aspects; Charging Management; Study on Charging Aspects of Edge Computing, (Release 17), Oct. 2021, 56 pages.
Samsung Electronics, "EAS Discovery Filter Flag", S6-201961, 3GPP TSG-SA WG6 Meeting #39-bis-e, Oct. 12-20, 2020, 3 pages.
International Search Report dated Jan. 31, 2023 issued in counterpart application No. PCT/KR2022/017419, 7 pages.

* cited by examiner

601

603

605

METHOD AND DEVICE FOR SUPPORTING EDGE APPLICATION SERVER IN WIRELESS COMMUNICATION SYSTEM SUPPORTING EDGE COMPUTING

CROSS-REFERENCE TO RELATED APPLICATION(S)

This application is based on and claims priority under 35 U.S.C. § 119 to Korean Patent Application Nos. 10-2021-0154339 and 10-2022-0039245, which were filed in the Korean Intellectual Property Office Nov. 10, 2021, and Mar. 29, 2022, respectively, the entire disclosure of each of which is incorporated herein by reference.

BACKGROUND

1. Field

The disclosure relates generally to a method and device for providing an edge computing service in a wireless communication system.

2. Description of Related Art

Fifth generation (5G) mobile communication technologies define broad frequency bands such that high transmission rates and new services are possible, and can be implemented not only in sub 6 GHz bands, such as 3.5 GHz, but also in above 6 GHz bands referred to as mmWave including 28 GHz and 39 GHz. In addition, it has been considered to implement sixth generation (6G) mobile communication technologies, referred to as beyond 5G systems, in terahertz bands (e.g., 95 GHz to 3 THz bands) in order to accomplish transmission rates that are fifty times faster than 5G mobile communication technologies and ultra-low latencies that are one-tenth of 5G mobile communication technologies.

Since the beginning of 5G mobile communication technology deployment, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There still are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN), which is UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Accordingly, it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), and also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The 3rd generation partnership (3GPP), which is in charge of cellular mobile communication standardization, has named the new core network structure 5G core (5GC) and standardized the same to promote the evolution from legacy fourth generation (4G) long term evolution (LTE) system to the 5G system.

5GC supports the following differentiated functions, as compared to the evolved packet core (EPC), which is the legacy network core for 4G.

First, 5GC adopts a network slicing function. Also, 5GC is required to support various types of UEs and services. Such services may include, e.g., eMBB, URLLC, and mMTC. These UEs/services have different requirements for the core network. The eMBB service requires, e.g., a high data rate, while the URLLC service requires high stability and low latency. Network slicing is proposed to meet such various requirements.

Network slicing is a method for creating multiple logical networks by virtualizing one physical network, and network slice instances (NSIs) may have different characteristics. Therefore, various service requirements may be met by allowing each NSI to have a network function (NF) suited for its characteristics. Various 5G services may be efficiently supported by allocating an NSI meeting required service characteristics for each UE.

Second, 5GC may seamlessly support the network virtualization paradigm by separating a mobility management function (MMF) and a session management function (SMF). In the legacy 4G LTE system, all UEs may receive services over the network through signaling exchange with a single core device called a mobility management entity (MME) in charge of registration, authentication, mobility management and session management functions. However, in 5G, the number of UEs explosively increases and mobility and traffic/session characteristics that need to be supported according to the type of UE are subdivided. Thus, if all functions are supported by a single device, such as the MME, the scalability of adding entities for each required function may decrease. Accordingly, various functions are under development based on a structure that separates the MMF and the SMF to enhance the scalability in terms of function/implementation complexity of the core equipment in charge of the control plane and the signaling load.

Edge computing systems are also emerging. In an edge computing system, a UE may establish a data connection to an edge data network (EDN), located nearby to use a low-latency or broadband service, to receive an edge computing service. The edge computing service may be provided through an edge application server (EAS) driven in an edge computing platform or an edge hosting environment operated by an edge enabler server (EES) of a specific EDN. In other words, the UE may receive an edge computing service from the EAS located closest to the area where the UE is located.

SUMMARY

The disclosure, which has been made to address at least the above-mentioned problems and/or disadvantages and to provide at least the advantages described below, provides a method and device for efficiently supporting an EAS in a wireless communication system supporting edge computing.

An aspects of the disclosure provides a method and device for efficiently supporting an EAS using a specific network slice in a wireless communication system supporting edge computing.

An aspect of the disclosure provides a method and device for supporting an EAS to which a network slice, not previously set in an EES, is applied in a wireless communication system supporting edge computing.

A further aspect of the disclosure provides a method and device for providing a UE with EAS information, not previously set in an EES in a wireless communication system supporting edge computing.

According to an aspect of the disclosure, a method performed by an EES in a wireless communication system supporting edge computing is provided. The method includes receiving, from an EAS not configured in the EES, a registration request message including network slice information related to the EAS; selecting a UE to which EAS information about the EAS is to be provided and a method for providing the EAS information; and providing the EAS information to the UE based on the selected method.

According to a further aspect of the disclosure, an EES is provided in a wireless communication system supporting edge computing. The EES includes a transceiver and a processor that is configured to receive, via the transceiver, from an EAS not configured in the EES, a registration request message including network slice information related to the EAS; select a UE to which EAS information about the EAS is to be provided and a method for providing the EAS information; and provide the EAS information to the UE based on the selected method.

According to yet another aspect of the disclosure, a method is provided for a UE in a wireless communication system supporting edge computing. The method includes transmitting, to an EES, a request message including filter information related to an EAS to which a specific network slice not previously configured in the EES is applied; and receiving a response message including at least one of network slice information related to the EAS and a data network name (DNN) from the EES based on the filter information.

According to a further aspect of the disclosure, a UE is provided for use in a wireless communication system supporting edge computing. The UE includes a transceiver and a processor that is configured to transmit, via the transceiver, to an EES, a request message including filter information related to an EAS to which a specific network slice not previously configured in the EES is applied; and receive, via the transceiver, a response message including at least one of network slice information related to the EAS and a DNN from the EES based on the filter information.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
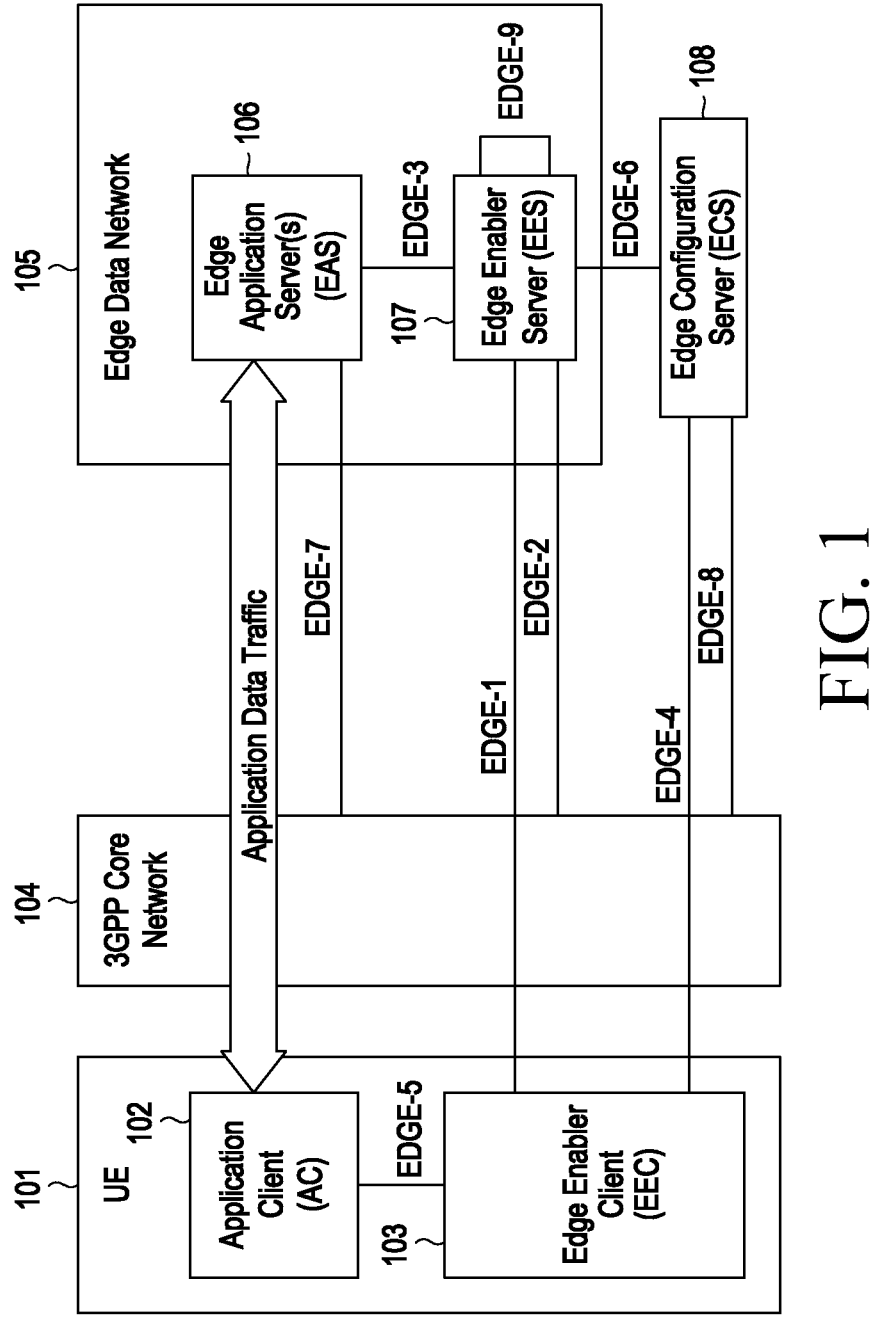
FIG. 1 illustrates a configuration of an edge computing system according to an embodiment.

Hereinafter, various embodiments of the disclosure are described in detail with reference to the accompanying drawings. The descriptions of techniques that are well known in the technical field to which the disclosure pertains and/or are not directly related to the disclosure may be omitted, for clarity.

Some elements may be exaggerated or schematically shown. The size of each element does not necessarily reflect the actual size of the element. The same or similar reference numeral may be used to refer to the same or similar element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided to inform one of ordinary skilled in the art of the category of the disclosure.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Each block may represent a module, segment, or part of a code including one or more executable instructions for executing a specified logical function(s). In some replacement execution examples, the functions mentioned in the blocks may occur in different orders. For example, two blocks that are consecutively shown may be performed substantially simultaneously or in a reverse order depending on corresponding functions.

As used herein, the term unit means a software element or a hardware element such as a field-programmable gate array (FPGA) or an application specific integrated circuit (ASIC). A unit plays a certain role. However, the term unit is not limited as meaning a software or hardware element. A unit may be configured in a storage medium that may be addressed or may be configured to reproduce one or more processors. Accordingly, a unit may include elements, such as software elements, object-oriented software elements, class elements, task elements, processes, functions, attributes, procedures, subroutines, segments of program codes, drivers, firmware, micro codes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card.

Hereinafter, a base station (BS) may be an entity that allocates resource to a terminal, such as an eNodeB (eNB), a Node B, a radio access network (RAN), an access network (AN), a RAN node, an NR NB, a gNB, a wireless access unit, a BS controller, or a node over network. The BS may be a network entity including at least one of an IAB-donor, which is a gNB providing network access to UE(s) through a network of backhaul and access links in the NR system, and an IAB-node, which is a RAN node supporting NR backhaul links to the IAB-donor or another IAB-node and supporting NR access link(s) to UE(s).

A UE is wirelessly connected through the IAB-node and may transmit/receive data to and from the IAB-donor connected with at least one IAB-node through the backhaul link. The UE may include a terminal, a mobile station (MS), a cellular phone, a smartphone, a computer, or a multimedia system capable of performing communication functions. Herein, a downlink (DL) refers to a wireless transmission path of signal transmitted from the BS to the terminal, and an uplink (UL) refers to a wireless transmission path of signal transmitted from the terminal to the BS.

Further, although an LTE-system or LTE-advanced (A)-based system is described in connection with certain embodiments of the disclosure, as an example, embodiments may also apply to other communication systems with similar technical background or channel form.

Further, embodiments may be modified in such a range as not to significantly depart from the scope of the disclosure under the determination by one of ordinary skill in the art and such modifications may be applicable to other communication systems.

The description of embodiments focuses primarily on the radio access network, new RAN, and the core network, packet core (5G system, or 5G core network, or NG core, or next generation core), which are specified by 3GPP which is a wireless communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

For ease of description, some of the terms or names defined in the 3GPP standards (standards for 5G, NR, long-term evolution (LTE), or similar systems) may be used. However, the disclosure is not limited by such terms and names and may be likewise applicable to systems conforming to other standards. Further, the disclosure may be applied to wireless communication systems supporting a network slice or network slicing.

The 5G system may support the network slice, and traffic for different network slices may be processed by different protocol data unit (PDU) sessions. The PDU session includes an association between a data network providing a PDU connection service and a UE. The network slice may be understood as technology for logically configuring a network with a set of NFs to support various services with different characteristics, such as broadband communication services, massive IoT, V2X, or other mission critical services, and separating different network slices. Therefore, even when a communication failure occurs in one network slice, communication in other network slices is not affected, so that it is possible to provide a stable communication service.

In the disclosure, the term slice may be interchangeably used interchangeably with network slice. In such a network environment, the UE may access a plurality of network slices when receiving various services. Further, the NF may be a software instance running on hardware and be implemented as a virtualized function instantiated on a network element or an appropriate platform.

The mobile communication carrier may constitute the network slice and may allocate network resources suitable for a specific service for each network slice or for each set of network slices. A network resource may mean an NF or logical resource provided by the NF or radio resource allocation of a BS.

For example, a mobile communication carrier may configure network slice A for providing a mobile broadband service, network slice B for providing a vehicle communication service, and network slice C for providing an IoT service. In other words, the 5G network may efficiently provide a corresponding service to a UE through a specialized network slice suited for the characteristics of each service. In the 5G system, the network slice may be represented as single-network slice selection assistance information (S-NSSAI). The S-NSSAI may include a slice/service type (SST) value and a slice differentiator (SD) value. The SST may indicate the characteristics of the service supported by the network slice (e.g., eMBB, IoT, URLLC, V2X, etc.). The SD may be a value used as an additional identifier for a specific service referred to as SST.

FIG. 1 illustrates a configuration of a wireless communication system supporting edge computing according to an embodiment.

Referring to FIG. 1, a UE 101 includes an application client (AC) 102 and an edge enabler client (EEC) 103. The AC 102 may be an application-level client for providing a specific application service to the user when an edge computing service is provided. The AC 102 may be used for multi-access edge computing services. The AC 102 is an application program running on the mobile operating system (OS) of the UE 101, and may be identified by the application identifier in a core network 104. In the communication environment providing the mobile OS, the AC 102 may be identified by an OS identifier (ID) and a unique application ID, e.g., an OSAppID, for each operating system. The EEC 103 provides supporting functions necessary for the AC 102. For example, the EEC 103 retrieves configuration information to enable the exchange of application data traffic between the AC 102 and the EAS 106 and provide it to the AC 102, and the EEC 103 may search for an EAS 155 available in the EDN 105.

The UE 101 may include a communication processor (CP) for communicating with another wireless communication network, e.g., at least one or more mobile communication networks. The UE 101 may also include an edge configuration client (ECC).

The 3GPP core network 104 is an example of the wireless mobile communication network, and may include, e.g., an EPC and/or a 5GC. The 3GPP core network 104 may include at least one BS that communicates directly with the UE 101 over-the-air (OTA) and may further include a higher core network component higher. When the 3GPP core network 104 includes a 5GC, the 5GC may include at least one of an access and mobility management function (AMF), an SMF, a policy control function (PCF), or a user plane function (UPF). When the 3GPP core network 104 includes an EPC, the EPC may include at least one network node (e.g., an MME managing mobility, a policy and charging rule function (PCRF) managing the operator's policy, a serving gateway (SGW) managing sessions, and a packet data network gateway (PGW) processing user traffic) corresponding to the 5GC.

The AC 102 of the UE 101 may access the EDN 105 through the 3GPP core network 104. In an embodiment, the EDN 105 may be implemented through a network slicing scheme, and a plurality of EDNs which may interwork with the core network 104 may be configured in the same form. The EDN 105 may be a data network of the 5GC or a packet data network of the EPC network. As an example, the EDN 105 may include an edge hosting platform and may include an EES 107 and one or more EASs 106. The EES 107 provides supporting functions necessary for the EAS 106 and the EEC 103. For example, the EES 107 may provide configuration information to the EAS 106 to enable exchange (transmission and reception) of application data traffic and provide information related to the EAS 106 to the EEC 103. In an embodiment, the EES 106 may include an edge enabler client manager, an edge enabler platform, and an edge enabler application programming interface (API) server.

The EAS 106 may be a virtual machine (VM) image running in the edge hosting environment or a third-party application server program running on the virtualization container. The EAS may be configured to provide an ultralow-latency service in a location close to the UE 101. The edge hosting platform may be platform software including a virtualization layer that may execute a plurality of edge application programs. Herein, edge hosting platform and edge hosting environment have the same concept and may be interchangeably used.

The edge computing system of FIG. 1 may include an EES 107, an edge configuration server (ECS) 108, and an EEC 103, and may provide an edge computing service to the application client 102 of the UE 101.

The EES 107 is a server for providing an edge computing service and may manage a list of application programs available to the EEC 103 of the UE 101 on the edge hosting environment (or edge hosting platform), manage configuration information about edge application programs (e.g., at least one EAS 106) running on the edge hosting platform, and provide the edge application programs with an API for the functions provided by the 3GPP core network 104.

The EES 107 may negotiate/communicate with the EEC 103 of the UE 101 to connect the UE's application client 102 with the EAS 106 in the edge hosting environment. The negotiation may be performed through mutual operation between the EEC 103 and the EES 107. The EEC 103 and the EES 107 which perform mutual operations, such as negotiation, may be referred to as edge enabling layers.

The EEC 103 may be software module of the UE 101 and may be a software agent having functions for providing an edge computing service. The EEC 103 may determine what application is able to use the edge computing service and perform the operation of connecting the network interface to allow the data of the AC 102 to be transferred to the EAS 106 providing the edge computing service. The operation of establishing a data connection to use the edge computing service may be performed by the 3GPP communication layer through the mobile communication function (e.g., mobile terminal (MT)) of the UE 101. The 3GPP communication layer may perform modem operations for using a mobile communication system, establish a wireless connection for data communication, register the UE with the mobile communication system, establish a connection for data transmission to the mobile communication system, and transmit/receive data.

The EEC 103 may perform at least one of an authentication function for accessing the edge computing server (e.g., the EES 107 and/or the ECS 108), a function for obtaining access information about the EDN 105 and the EES 107 in conjunction with the ECS 108, a function for obtaining information about one or more EASs 106 from the EES 107, or a function for routing traffic of one or more ACs 102 in the UE 101 to one or more EASs 106 based on the information about one or more EASs) 106.

The EDN 105 may include an orchestrator for edge hosting platform. The orchestrator may be a management system to manage the lifecycle for edge application programs running on the edge hosting platform and manage the edge hosting platform and perform, e.g., the functions of the orchestrator, defined in the European telecommunication standards institute management and network operation (ETSI MANO).

As distinguished from the EDN 105, the ECS 108 capable of communicating with the EEC 103 of the UE 101 through the 3GPP core network 104 may be an initial access server that may receive configuration information for the UE 101 to use the MEC service. The ECS 108 may be aware of deployment information about the EES 107 and provide the UE 101 with configuration information related to the EDN 105 for using the edge computing service.

The configuration information may include at least one of EDN connection information (including, e.g., at least one of a DNN or the S-NSSAI) related to the EDN 105, service area information (e.g., cell list, list of tracking area, or public land mobile network (PLMN) ID) about the EDN 105, or connection information (e.g., uniform resource identifier (URI)) about the EES 107.

The service area of the EDN 105 may be an area set by the EES 107. The UE 101 may obtain information about the EES 107 accessible in the current location, based on the information about the service area of the EDN 105. If the ECS 108 of the EDN 105 is aware of the information about the EAS 106 running in the edge hosting environment of a specific EES 107, the UE 101 may obtain the information from the ECS 108 through the EEC 103.

In FIG. 1, EDGE-1 to EDGE-9 refer to network interfaces (i.e., reference points) between the entities, with a description of the EDGE-1 to EDGE-9 provided in 3GPP standard TS 23.558 v17.1.0 (2021-09).

The edge computing system for supporting edge computing as shown in FIG. 1 may be managed by a separate edge computing service provider from the mobile communication service provider, and there may be a plurality of separate edge computing service providers (ECSPs) in one mobile communication service provider network. The edge computing system for supporting edge computing as shown in FIG. 1 may support the service provider's configuration.

The edge computing system disclosed in FIG. 1 may support a plurality of ECSPs in one mobile communication network. Further, the edge computing system of FIG. 1 may transfer a plurality of ECSPs available in one mobile communication network and configuration information for accessing the edge computing network installed by the service provider to the UE 101.

The edge computing system disclosed in FIG. 1 may transfer an edge network service provider selected by the mobile communication service provider among the plurality of ECSPs present in one mobile communication network and configuration information for accessing the edge computing network installed by the selected edge network service provider to the UE 101.

In the edge computing system shown in FIG. 1, the EEC 103 in the UE 101 may receive DNN and S-NSSAI information in units of EDN from the ECS 108 to access the EES 107 and the EAS 106. In this case, when a URSP is applied to the UE 101, the URSP may be preferentially considered. The URSP may include policy information related to access network search and selection and be provided from the network to the UE 101.

If the EAS 106 is installed in the EDN 105 through instantiation, the EAS 106 may be registered with the EES 107, and information about the EAS 106 is stored in the ECS 108. The information about the EAS 106 may be transmitted to the EEC 103 in response to an EAS discovery request from the EEC 103.

A dedicated EAS to which a specific network slice is applied may not be previously configured in the EES. For connection with the dedicated EAS, the UE 101 may transmit an EAS discovery request message to the EES 107 to request EAS discovery. However, if information previously configured in the EES 107 does not match the EAS to which the specific network slice is applied or the information about the EAS is not registered with the EES 107, a procedure for registering the EAS, to which the specific network slice is applied, with the EDN may be required, the EDN information may be provided to the UE 101, and a procedure in which the EEC 103 of the UE 101 repeats the transmission of an EAS discovery request message to the EDN based on the received EDN information may be required. When the URSP is not applied to the UE 101, a DNN, S-NSSAI configuration method per service does not exist. Upon installing a dedicated EAS using a new DNN and S-NSSAI, the EAS 106 may transfer its DNN and S-NSSAI information to the 5GC, and transfer a request for applying the URSP to the UE 101 to the 5GC. In this case, a procedure for the EES 107 to transfer a request for applying the URSP to the 5GC may be required. Further, the EES 107 should be able to transfer the information, provided by the EAS, to the UE requiring connection with the EAS as well as the UE requesting EAS discovery. In this case, the EES 107 may need information (e.g., an indicator) for identifying the information provided from the EAS and providing a URSP guidance to the 5GC.

Accordingly, a scheme is provided for the EES to receive the information about the dedicated EAS and a scheme is provided for supporting the EES for the UE to connect with the dedicated EAS. Also, a scheme is provided for supporting the EES to address a mismatch between configuration information allocated to the EDN, i.e., EDN configuration information, and the information applied to the EAS. As an example method for supporting the EES for the dedicated EAS, the UE may send a discovery request for the dedicated EAS to the EES to use the dedicated EAS. The dedicated EAS may provide the EES with at least one of DNN/network slice information (e.g., S-NSSAI) (optionally paired with PLMN ID) related to the dedicated EAS, URSP create request indicator, or replacement allowance indication related to the dedicated EAS, through a registration request. Further, the EES receiving the registration request from the dedicated EAS may determine/select the UE to which at least one of the pieces of information provided from the dedicated EAS is to be transferred. Also proposed is a method in which the EES includes the EAS information about the dedicated EAS in a URSP guidance request and transmit it using the API of the 5GC, a method for selecting the UE where the URSP update is to be performed, and a method for configuring a routing selection descriptor. Herein, the term dedicated EAS is for convenience of description and may be interchangeably used with other various terms indicating the EAS requiring registration/ configuration in the EES.

Figure 2:
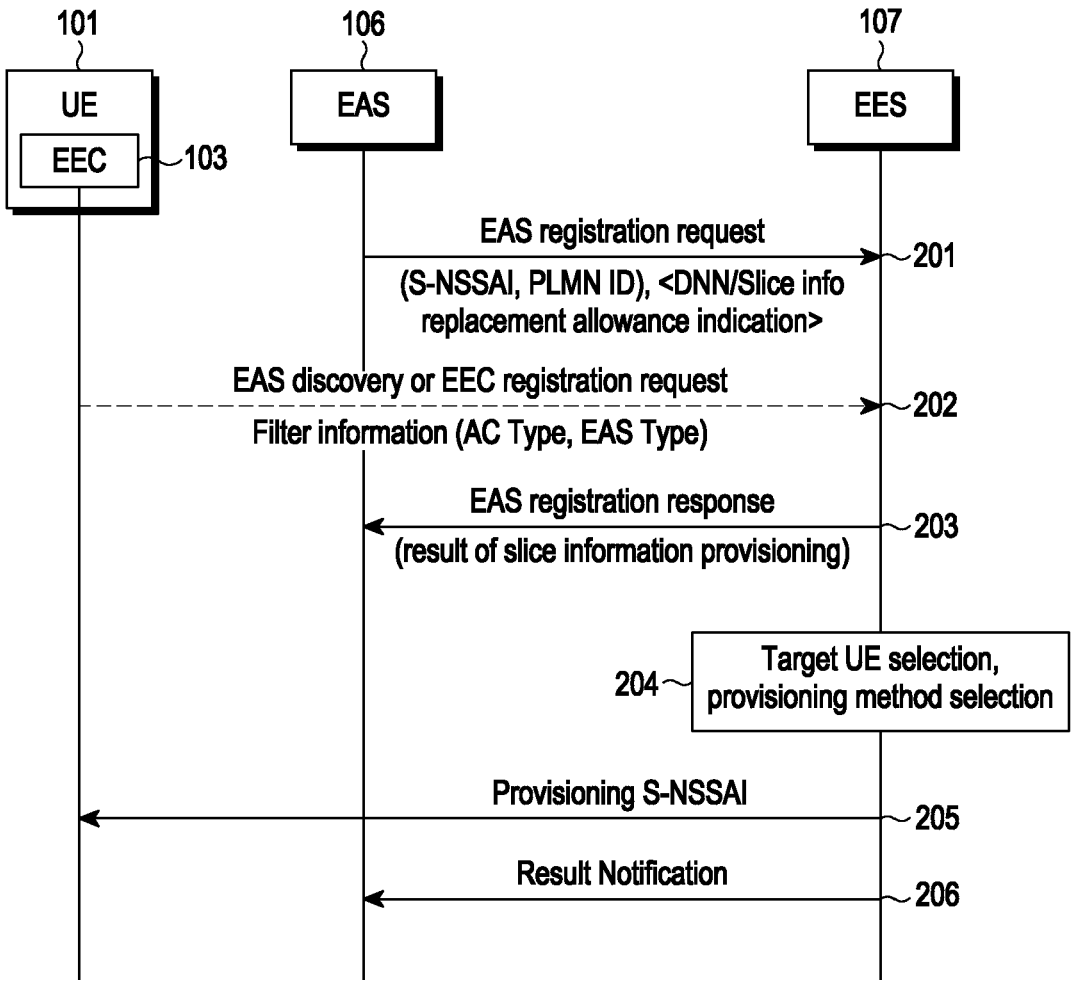
FIG. 2 illustrates a procedure for connection between a UE and an EAS by provisioning of a dedicated EAS in an edge computing system according to an embodiment.

FIG. 2 illustrates a procedure for connection between a UE and an EAS by provisioning of a dedicated EAS in a wireless communication system supporting edge computing according to an embodiment. In FIG. 2, it is assumed that the EAS 106 is a dedicated EAS 106 to which a network slice, which is not previously configured in the EES 107, is applied as in the above-described example. For ease of explanation, the embodiment of FIG. 2 is described with reference to the configuration of FIG. 1.

Referring to FIG. 2, in step 201, a dedicated EAS 106 is instantiated to provide a service to the EDN and transmits an EAS registration request message to the EES 107. The EAS registration request message transmitted from the EAS 106 may include at least one of a PLMN ID, S-NSSAI, and DNN/slice info replacement allowance indication associated with the dedicated EAS 106. The instantiation refers to a state in which the EAS 106 is driven to provide a service.

Regarding DNN/slice info replacement allowance indication, an indicator is provided indicating whether to allow the use of another DNN (or indicating allowance for use). When there is the corresponding indicator, the EES 107 may configure a DNN other than the existing DNN or the DNN provided by the EDN, in the UE 101 or the 5GC.

In step 203, the EES 107 receives the EAS registration request message, performs registration on the EAS 106, and (re)configures EES configuration information about the EAS 106. If the configuration for the EAS 106 is completed, the EES 107 may transmit an EAS response message to the EAS registration request to the EAS 106. The EAS registration response message may include the result of slice information provisioning.

Regarding a result of slice information provisioning, information indicating whether the DNN/slice information requested by the EAS 106 to be registered is successfully configured in the EES 107. Unless the DNN/slice information requested to be registered is configured in the EES 107, e.g., as configuration rejection or registration failure in the EES 107 or registration failure, the EAS 106 and the EES 107 each may perform the following operations. The configuration rejection or registration failure may occur in various contexts (e.g., when the UE is not registered with the DNN, or when it differs from group-related data, or when UE subscription or group-related data cannot dynamically modify the URSP rule by the AF or specific AF or MTC provider, or by ECSP policy-The EAS 106 may attempt registration with the EES 107 (for ensuring the quality-of-service (QoS)).

The EES 107 may be set to the QoS ensured by the EES 107.

In step 204, the EES 107 performs at least one of target UE selection and provisioning method selection to perform the operation for provisioning of the dedicated EAS 106.

For target UE selection, the EES 107 may select the UE 101 to perform EAS information provisioning through one or more of operations (1) to (5), as described below. Regarding operation (1), when the filter information received from the EEC 103 of the UE 101 includes the corresponding EAS information, the EAS profile included in the EAS discovery request message transmitted from the EEC 103 may include the EAS type. When the EAS type matches the DNN/slice type of the dedicated EAS 106, the EES 107 may select the UE 101. In this case, as illustrated in step 202 of FIG. 2, an EAS discovery request message including the EAS type may be transmitted from the UE 101 to the EES 107.

Regarding operation (2), the EES 107 may perform target UE selection upon receiving the EEC registration request from the UE 101. The EEC registration request message may include an EEC context including an AC profile. The AC profile may include the AC type and, when the AC type included in the AC profile supports the DNN/slice type of the dedicated EAS 106, the EES 107 may select the UE 101.

Regarding operation (3), the EES 107 may select the UE 101 according to the ECSP policy.

Regarding operation (4) The EES 107 may perform target UE selection on the UE 101 in a specific area, configured in the EES 107.

Regarding operation (5), a subscriber list for target UE selection may be configured in the EES 107.

In operations (1) and (2), from among operations (1) to (5) for target UE selection, as in step 202 of FIG. 2, an EAS discovery request message or EEC registration request message may be transmitted from the UE 101 to the EES 107. Operations (3) to (5) may omit step 202 of FIG. 2. Accordingly, step 202 may be optionally performed.

Regarding the provisioning method selection, the EES 107 may select a method for provisioning the EAS information to the UE 101, by a notification for reception of the EAS discovery request message or EEC registration request message from the UE 101.

As illustrated in FIG. 2, the EEC 103 may provide filter information for EAS discovery to the EES 107 through an EAS discovery request message or EEC registration request message. The EES 107 may receive the filter information and, when the EAS type included in the received filter information does not match the DNN/slice type of the dedicated EAS 106 or the AC type included in the received filter information supports the DNN/slice type of the dedicated EAS 106, the EES 107 may select an EAS discovery response or EAS discovery notification as the method for providing S-NSSAI, DNN information related to the dedicated EAS 106 (provisioning method selection), for the selected UE 101.

In step 205, the EES 107 provisions the S-NSSAI, DNN related to the dedicated EAS 106 using the selected method (EAS discovery response, EAS discovery notification) to the selected UE 101.

In step 206, the EES 107 notifies the EAS 106 of the result of provisioning to the selected UE 101.

Figure 3:
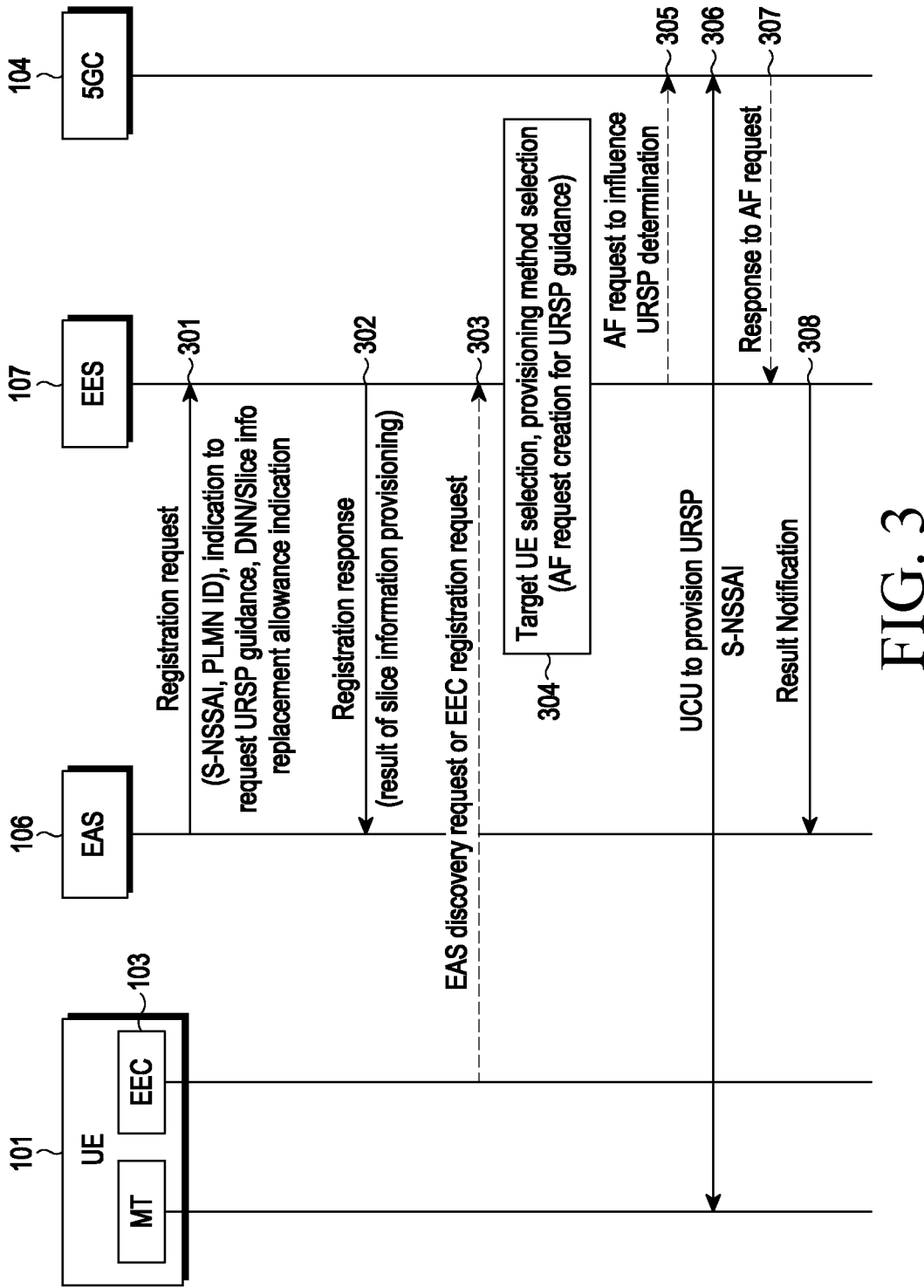
FIG. 3 illustrates a procedure for connection between a UE and an EAS using a UE route selection policy (URSP) influence of a dedicated EAS in an edge computing system according to an embodiment.

FIG. 3 illustrates a procedure for connection between a UE and an EAS using URSP influence of a dedicated EAS in a wireless communication system supporting edge computing according to an embodiment. In FIG. 3, it is assumed that the EAS 106 is a dedicated EAS 106 to which a network slice, which is not previously configured in the EES 107, is applied. For ease of description, the embodiment of FIG. 3 is described with reference to the configuration of FIG. 1.

Referring to FIG. 3, in step 301, a dedicated EAS 106 is instantiated to provide a service to the EDN and transmits an EAS registration request message to the EES 107. The EAS registration request message transmitted from the EAS 106 may include at least one of a PLMN ID, a S-NSSAI, a DNN/slice info replacement allowance indication, and an indication to request URSP guidance associated with the dedicated EAS 106.

Regarding DNN/slice info replacement allowance indication, an indicator is provided indicating whether to allow the use of another DNN. When a corresponding indicator exists, the EES 107 may configure a DNN other than the existing DNN or the DNN of the EDN, in the UE 101 or the 5GC.

Regarding an indication to request URSP guidance, an indicator is generated by the EAS 106 for URSP guidance influence. The EES 107 receiving the indicator may send a URSP guidance request for providing the UE 101 with the URSP for connection between the UE 101 and the EAS 106 to an application function (AF) influence using the API of a network exposure function (NEF) in the 5GC. The EES 107 may select considering the PLMN ID of the UE 101 and the EAS 106 from the EEC 103, EAS 106. The EES 107 may include the AF descriptor in the URSP guidance request message and transmit the AF descriptor, using the information received from the EAS 106 and the EEC 103.

Further, the EES 107 may send the URSP guidance request message to the 5GC using the UDR or PCF in the 5GC.

In step 302, the EES 107 receives the EAS registration request message, performs registration on the EAS 106, and (re)configures EES configuration information about the EAS 106. If the configuration for the EAS 106 is completed, the EES 107 may transmit an EAS response message to the EAS registration request to the EAS 106. The EAS registration response message may include the result of slice information provisioning.

Regarding that result of slice information provisioning, information is provided indicating whether the DNN/slice information requested by the EAS 106 to be registered is successfully configured in the EES 107. Unless the DNN/slice information requested to be registered is configured in the EES 107, e.g., as configuration rejection or registration failure in the EES 107 or registration failure, the EAS 106 and the EES 107 each may perform the following operations.

The EAS 106 may attempt registration with the EES 107 to ensure the QoS.

The EES 107 may be set to the QoS ensured by the EES 107.

Upon receiving the DNN/slice info replacement allowance indication through the EAS registration request message, the EES 107 may configure a routing selection descriptor as the EDN slice information.

Upon receiving the indication to request URSP guidance from the EAS 106, the EES 107 may determine whether URSP guidance may be performed on the PLMN ID identified in the 5GC in relation to the EAS 106.

Upon determining whether the URSP guidance operation may be performed, the EES 107 may configure a traffic descriptor and routing selection descriptor based on the information received from the EAS 106 through the EAS registration request message. The traffic descriptor is one of the components included in the URSP and is information that describes the data flow to find the matching application to apply the rule. The routing selection descriptor is information for determining a method for routing a matching flow and may include at least one of, e.g., the PDU session type and/or optionally, a service and session continuity (SSC) mode, one or more S-NSSAIs, one or more DNNs, a preferred access type, a multiple access preference, a time reference, or a position reference.

In step 303, the EES 107 receives at least one of the EEC registration request message transmitted from the UE 101 or UE type information from the EAS discovery request message, serving PLMS ID, or information indicating whether the UE 101 has URSP capability. The at least one piece of information may be used as filter information to determine whether to perform URSP guidance of the EAS 106 where the EES 107 is specified. As described in connection with FIG. 2, the EEC registration request message or EAS discovery request message may be optionally transmitted, so that step 303 may be optionally performed.

In step 304, to perform the operation for provisioning of the dedicated EAS 106, the EES 107 performs one or more operations among operations (a), (b), and (c), as set forth below.

(a) Target UE selection (b) Provisioning method selection (c) AF request creation for URSP guidance Regarding the target UE selection, the EES 107 may select the UE 101 to perform EAS information provisioning through one or more of operations (1) to (5) in the embodiment described above in connection with FIG. 2.

Regarding the provisioning method selection, the EES 107 may select a method for provisioning the EAS information to the UE 101, by a notification for reception of the EAS discovery request message or EEC registration request message from the UE 101. In other words, the EES 107 may receive the filter information from the EEC 103 through an EAS discovery request message or an EEC registration request message and, when the EAS type included in the filter information does not match the DNN/slice type of the dedicated EAS 106 or the AC type included in the filter information supports the DNN/slice type of the dedicated EAS 106, the EES 107 may select to perform URSP guidance as the method for providing S-NSSAI, DNN information related to the dedicated EAS 106 (provisioning method selection), for the selected UE 101.

Specifically, in step 304, upon receiving a URSP guidance indicator through the EAS registration request message from the UE 101, the EES 107 determines an ability to perform the URSP guidance. If the EES 107 determines to perform the URSP guidance, the EES 107 may configure a traffic descriptor and a routing selection descriptor based on the information received from the EAS 106 to create an AF request according to the URSP guidance.

In step 305, the EES 107 may transmit an AF request according to the URSP guidance configured in operation 304 to the NEF of a 5GC 104, requesting the URSP guidance influence.

In step 306, the NEF of the 5GC 104 performs a UE configuration update for URSP provisioning to the UE 101. The NEF may transmit a UE configuration update command including the URSP to the UE. Based on the URSP, the UE may be configured with the S-NSSAI, DNN for the EAS 106.

In step 307, the NEF of the 5GC 104 provides a response message to the URSP provisioning to the EES 107. The response message may include a URSP provisioning authorization message or a UE configuration update (UCU) success message.

In step 308, the EES 107 notifies the EAS 106 of the result of the URSP provisioning.

Figure 4:
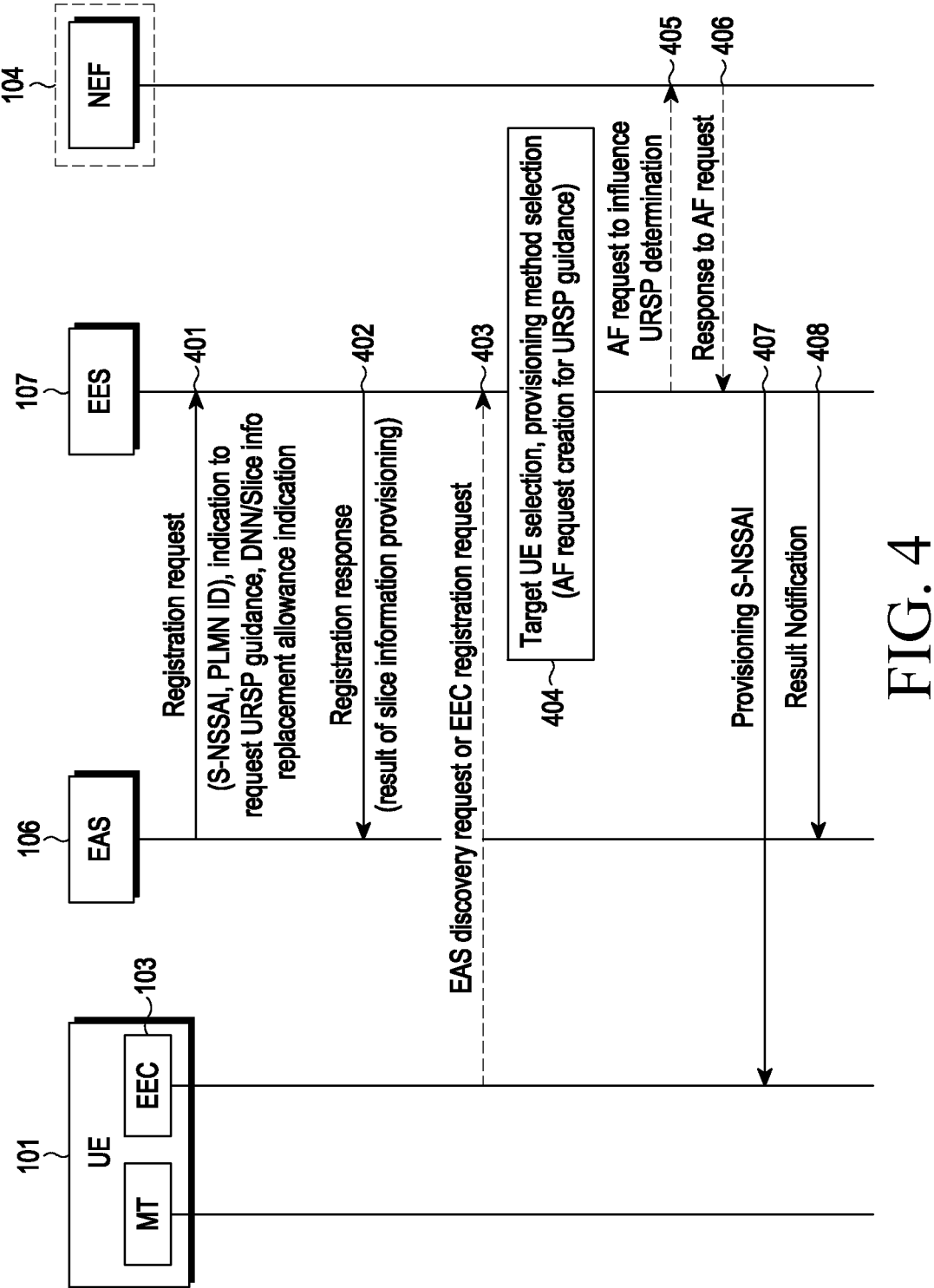
FIG. 4 illustrates a procedure for connection between a UE and an EAS using URSP influence of a dedicated EAS in an edge computing system according to an embodiment.

FIG. 4 illustrates a procedure for connection between a UE and an EAS using URSP influence of a dedicated EAS in a wireless communication system supporting edge computing according to an embodiment. In FIG. 4, it is assumed that the EAS 106 is a dedicated EAS 106 to which a network slice, which is not previously configured in the EES 107, is applied. For ease of description, the embodiment of FIG. 4 is described with reference to the configuration of FIG. 1.

Referring to FIG. 4, steps 401 to 404 of selecting the UE 101 to which the EAS information is provisioned through signaling between the EES 107, the EAS 106, and/or the EEC 103, selecting a method for provisioning the EAS information to the UE 101, and configuring the AF request according to the URSP guidance are the same as steps 301 to 304 as described above in connection with FIG. 3, and as such, a detailed description thereof is omitted.

In step 405, the EES 107 configuring the AF request according to the URSP guidance transmits the configured AF request to the NEF of the 5GC, requesting URSP guidance influence.

In step 406, when URSP provisioning is authorized, but the UE configuration update has failed or may not be updated, the NEF 104 of the 5GC receiving the AF request transmits a response message including information indicating that the UE configuration update has failed or may not be updated to the EES 107.

In step 407, the EES 107 receiving the response message provisions the S-NSSAI, DNN related to the EAS 106 to the selected UE 101 for provisioning the EAS information using the method (EAS discovery response or EAS discovery notification) selected in step 404.

In step 408, the EES 107 notifies the EAS 106 of the provisioning result for the EAS information.

According to the above-described embodiments, the instantiated EAS, along with the S-NSSAI, DNN information related to the EAS, may be registered with the EES and transfer the EAS information directly to the UE through the EES, to allow the UE to connect to the EAS or send a request for URSP update to the 5GC through the AF request of the EES to allow the UE to connect to the EAS through the URSP update. Further, the EES may perform a UE selection operation for provisioning the dedicated EAS, to which the specific network slice is applied to the UE and, to obtain information for UE selection, obtain AC information supporting the EAS through the EEC registration request, EAS discovery operation to select the UE. Also, the EES may determine whether to perform URSP guidance on the EAS based on the filter information received from the EEC. If no filter information is provided from the EEC, the URSP guidance operation may be performed depending on whether the ECSP policy or EEC-selected EAS declaration message is received. The EES may receive the EAS information provisioning result and then notify the EAS of it.

Figure 5:
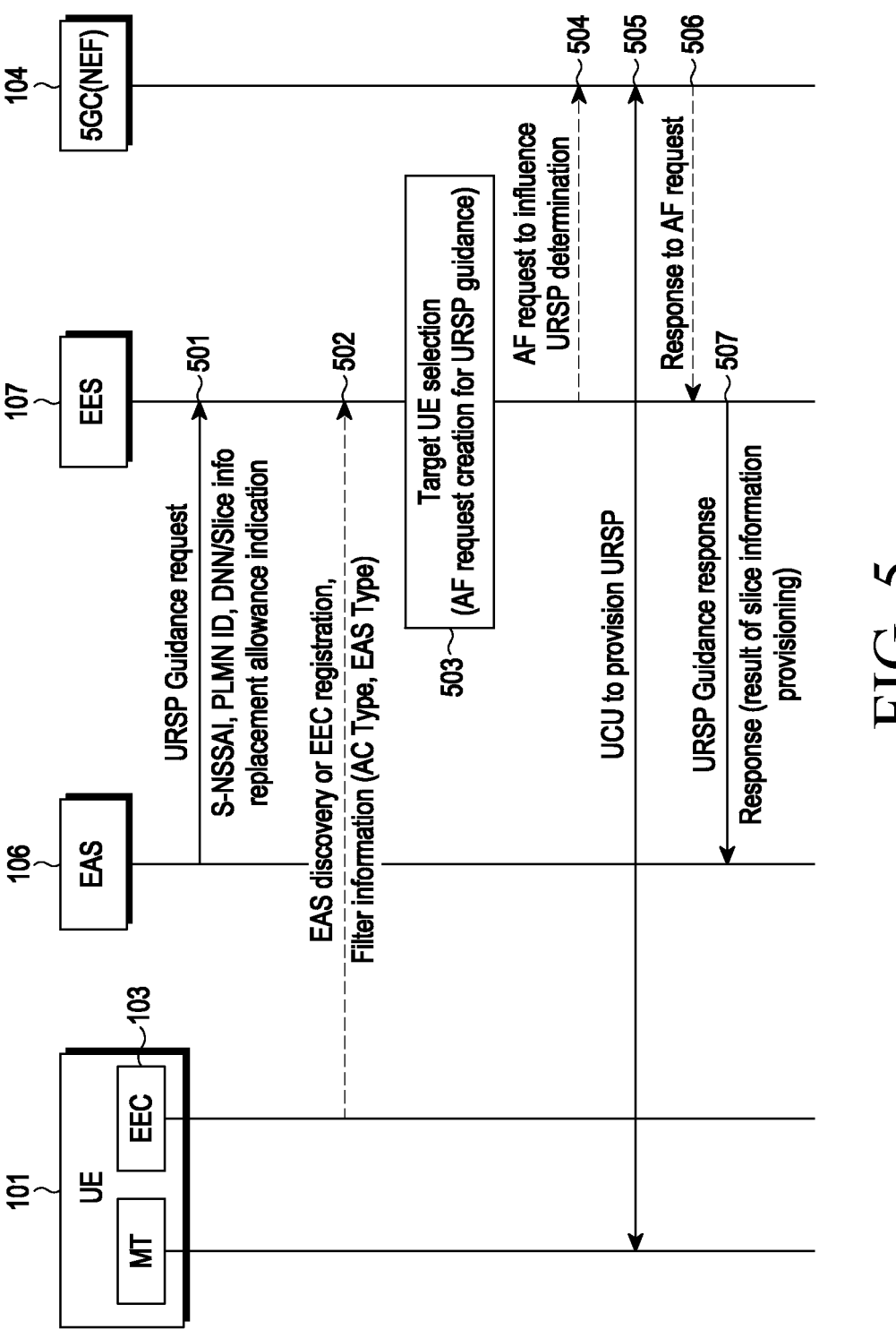
FIG. 5 illustrates a procedure for connection between a UE and an EAS using URSP influence of a dedicated EAS in an edge computing system according to an embodiment.

FIG. 5 illustrates a procedure for connection between a UE and an EAS using URSP influence of a dedicated EAS in a wireless communication system supporting edge computing according to an embodiment. In FIG. 5, it is assumed that the EAS 106 is a dedicated EAS 106 to which a network slice, which is not previously configured in the EES 107, is applied.

Referring to FIG. 5, in step 501, the EAS 106 may include at least one of slice information (optionally paired with PLMN ID) and a URSP create request indicator, or EAS service slice information replacement in the URSP guidance request message using the API of the EES 107, and sends a URSP configuration request message (i.e., URSP guidance request message) directly to the EES 107.

In step 502, the EEC 103 of the UE 101 transmits an EAS discovery request message or EEC registration request message including the filter information to the EES 107.

In step 503, the EES 107 selects a target UE based on registered EEC information and information included in the request message received from the EAS 106 in step 501. The target UE may be selected based on the information included in the EAS discovery request message or EEC registration request message received from the EEC 103.

Specifically, in step 503, the target UE selection is described. The EES 107 may select the UE 101 to perform EAS information provisioning through one or more of operations (1) to (5), as set forth below.

In operation (1), when the filter information received from the EEC 103 of the UE 101 includes the corresponding EAS information, the EAS profile included in the EAS discovery request message transmitted from the EEC 103 may include the EAS type. When the EAS type matches the DNN/slice type of the dedicated EAS 106, the EES 107 may select the UE 101. In this case, as in step 502 of FIG. 5, an EAS discovery request message including the EAS type may be transmitted from the EEC 103 to the EES 107.

In operation (2), the EES 107 may perform target UE selection upon receiving the EEC registration request from the EEC 103 of the UE 101. The EEC registration request message may include an EEC context including an AC profile. The AC profile may include the AC type and, when the AC type included in the AC profile supports the DNN/slice type of the dedicated EAS 106, the EES 107 may select the UE 101.

In operation (3), the EES 107 may select the UE 101 according to the ECSP policy.

In operation (4), the EES 107 may perform target UE selection on the UE 101 in a specific area, configured in the EES 107.

In operation (5), a subscriber list for target UE selection may be configured in the EES 107.

Step 502 may be optionally performed as in the embodiment of FIG. 2.

In step 504, the EES 107 determines whether the operation for URSP configuration may be performed and, if it is determined to perform the operation, configures an AF request and send the request to the 5GC (NEF) 104.

The AF request may be configured to include a traffic descriptor and a routing selection descriptor based on the information received from the EAS 106 by the EES 107.

In step 505, the 5GC (NEF) 104 performs UE configuration update for URSP provisioning to the UE 101. The NEF of the 5GC may transmit a UE configuration update command including the URSP to the UE 101. Based on the URSP, the UE 101 may be configured with the S-NSSAI, DNN for the EAS 106.

In step 506, the NEF of the 5GC 104 may provide a response message to the URSP provisioning to the EES 107. The response message may include a URSP provisioning authorization message or a UCU success message.

When URSP provisioning is authorized, but the UE configuration update has failed or may not be updated, the NEF of the 5GC 104 receiving the AF request may transmit a response message including information indicating that the UE configuration update has failed or may not be updated to the EES 107.

In step 507, the EES 107 sends a result of URSP application or update for the EAS information, as a response message, to the EAS 106.

Accordingly, the instantiated EAS, along with the S-NSSAI, DNN information related to the EAS, may be registered with the EES and transfer the EAS information directly to the UE through the EES, to allow the UE to connect to the EAS or send a request for URSP update to the 5GC through the AF request of the EES to allow the UE to connect to the EAS through the URSP update. Further, the EES may perform UE selection operation for provisioning the dedicated EAS, to which the specific network slice is applied to the UE and, to obtain information for UE selection, obtain AC information supporting the EAS through the EEC registration request, EAS discovery operation to select the UE. Also, the EES may determine whether to perform URSP guidance on the EAS based on the filter information received from the EEC. If there is no filter information provided from the EEC, the URSP guidance operation may be performed depending on whether the ECSP policy or EEC-selected EAS declaration message is received. The EES may receive the result of EAS information application or update and then transmit a response message to the EAS.

Figure 6:
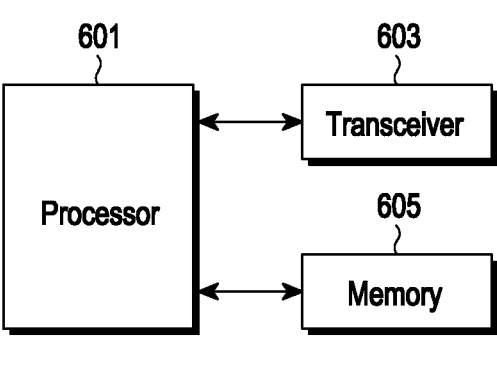
FIG. 6 illustrates a configuration of a network entity according to an embodiment.

FIG. 6 illustrates a configuration of a network entity according to an embodiment. The network entity of FIG. 6 may be the UE (or EEC) or one of the NFs, such as the EAS, EES, and NEF, described above in connection with FIGS. 1 to 5.

Referring to FIG. 6, the network entity includes a processor 601 configured to control the overall operation of the network entity according to one or a combination of two or more of the embodiments of FIGS. 1 to 5, a transceiver 603 including a transmitter and a receiver, and a memory 605. Without limited thereto, the network entity may include fewer or a greater number of components than those shown in FIG. 6. The transceiver 603 is configured to transmit/receive signals to/from at least one of other network entities or a UE. The signals transmitted/received with at least one of the other network entities or the UE may include at least one of control information and data.

The processor 601 may be configured to control the overall operation of the network entity to perform operations according to one or a combination of two or more of the embodiments of FIGS. 1 to 5, as described above. The processor 601, the transceiver 603, and the memory 605 are not necessarily implemented in separate modules but rather as a single chip. The processor 501 and the transceiver 603 may be electrically connected with each other. The processor 501 may be an application processor (AP), a CP, a circuit, an application-specific circuit, or at least one processor. The transceiver 603 may include a communication interface for wired/wireless transmitting/receiving signals to/from another network entity.

The memory 605 may store a default program for operating the network entity, application programs, and data, such as configuration information. The memory 605 provides the stored data according to a request of the processor 601. The memory 605 may include a storage medium, such as read only memory (ROM), random access memory (RAM), a hard disk, a compact disc (CD)-ROM, and a digital versatile disc (DVD), or a combination of storage media. There may be provided a plurality of memories 605. The processor 601 may perform at least one of the above-described embodiments based on a program for performing operations according to at least one of the above-described embodiments stored in the memory 605.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments via an external port. A separate storage device over the communication network may be connected to the device that performs embodiments.

The above-described configuration views, example views of control/data signal transmission methods, example views of operational procedures, and configuration views are not intended as limiting the scope of the disclosure. That is, all the components, network entities, or operational steps described in connection with the embodiments should not be construed as essential components to practice the disclosure, and the disclosure may be rather implemented with only some of the components without departing from the main ideas of the disclosure. The embodiments may be practiced in combination, as necessary. For example, some of the methods proposed herein may be combined to operate the network entity and the terminal.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms a, an, and the are intended to include the plural forms as well, unless the context clearly indicates otherwise.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by an edge enabler server (EES) providing supporting functions for an edge application server (EAS) and an edge enabler client (EEC) of a user equipment (UE) in a wireless communication system supporting edge computing, the method comprising:

receiving, from at least one of the EAS or the EEC, a registration request message including at least one of network slice information related to the EAS, EAS type information, or application client (AC) type information related to supporting a network slice or a data network name (DNN) of the EAS;

performing a configuration of the EAS with EAS information associated with the network slice information;

identifying the UE to which EAS information about the EAS is to be provided; and providing the EAS information to the UE.

2. The method of claim 1, wherein selecting a UE comprises selecting the UE to which the EAS information is to be provided based on at least one of filter information received from the UE, an edge computing service provider (ECSP) policy, area information set in the EES, or a subscriber list.

3. The method of claim 1, further comprising identifying a method for providing the EAS information to the UE, wherein the method for providing the EAS information comprises providing the EAS to the UE directly by the EES, using one of an EAS discovery response or an EAS discovery notification.

4. The method of claim 1, wherein providing the EAS information to the UE comprises transmitting a request message according to a UE route selection policy (URSP) guidance to a network exposure function (NEF) of a core network in case that the EES receives information related to a URSP guidance request from the EAS.

5. An edge enabler server (EES) providing supporting functions for an edge application server (EAS) and an edge enabler client (EEC) of a user equipment (UE) in a wireless communication system supporting edge computing, the EES comprising:

a transceiver; and a processor configured to:

receive, via the transceiver, from at least one of the EAS or the EEC, a registration request message including at least one of network slice information related to the EAS, EAS type information, or application client (AC) type information related to supporting a network slice or a data network name (DNN) of the EAS, perform a configuration of the EAS with EAS information associated with the network slice information;

identify the UE to which EAS information about the EAS is to be provided, and provide the EAS information to the UE.

6. The EES of claim 5, wherein the processor is further configured to select the UE to which the EAS information is to be provided based on at least one of filter information received from the UE, an edge computing service provider (ECSP) policy, area information set in the EES, or a subscriber list.

7. The EES of claim 5, wherein the processor is further configured to identify a method for providing the EAS information to the UE, and wherein the method for providing the EAS information comprises providing the EAS information to the UE directly by the EES, using one of an EAS discovery response or an EAS discovery notification.

8. The EES of claim 5, wherein the processor is further configured to transmit a request message according to a UE route selection policy (URSP) guidance to a network exposure function (NEF) of a core network through the transceiver in case that the EES receives information related to a URSP guidance request from the EAS.

9. A method performed by a user equipment (UE) in a wireless communication system supporting edge computing, the method comprising:

transmitting, to an edge enabler server (EES), a request message including filter information related to an edge application server (EAS) to which a specific network slice not previously configured in the EES is applied, the filter information including at least one of EAS type information or application client (AC) type information related to support the specific network slice, the EES providing supporting functions for the EAS and an edge enabler client (EEC) of the UE; and receiving a response message including at least one of network slice information related to the EAS or a data network name (DNN) from the EES based on the filter information.

10. A user equipment (UE) in a wireless communication system supporting edge computing, the UE comprising:

a transceiver; and a processor configured to:

transmit, via the transceiver, to an edge enabler server (EES), a request message including filter information related to an edge application server (EAS) to which a specific network slice not previously configured in the EES is applied, the filter information including at least one of EAS type information or application client (AC) type information related to support the specific network slice, the EES providing supporting functions for the EAS and an edge enabler client (EEC) of the UE, and receive, via the transceiver, a response message including at least one of network slice information related to the EAS or a data network name (DNN) from the EES based on the filter information.

* * * * *